(12) United States Patent
Yhann

(10) Patent No.: US 7,046,403 B1
(45) Date of Patent: May 16, 2006

(54) IMAGE EDGE COLOR COMPUTATION

(75) Inventor: Stephan R. Yhann, Renton, WA (US)

(73) Assignee: Adobe Systems Incorporated, San Jose, CA (US)

( * ) Notice: Subject to any disclaimer, the term of this patent is extended or adjusted under 35 U.S.C. 154(b) by 927 days.

(21) Appl. No.: 09/945,113

(22) Filed: Aug. 31, 2001

(51) Int. Cl.
*G03F 3/08* (2006.01)

(52) U.S. Cl. .................... 358/518; 358/1.9; 345/591; 345/593; 345/597; 345/598; 345/619; 382/253; 382/199; 382/167

(58) Field of Classification Search ............... 358/1.9, 358/518, 540; 345/591, 593, 597, 590, 582, 345/620, 589; 382/299, 253, 199, 274, 167; 715/527
See application file for complete search history.

(56) References Cited

U.S. PATENT DOCUMENTS

| | | | | |
|---|---|---|---|---|
| 4,855,934 A | * | 8/1989 | Robinson ................. | 345/582 |
| 5,295,236 A | * | 3/1994 | Bjorge et al. ............. | 715/527 |
| 5,542,052 A | * | 7/1996 | Deutsch et al. ........... | 345/589 |
| 5,715,331 A | * | 2/1998 | Hollinger ................. | 382/199 |
| 5,721,572 A | * | 2/1998 | Wan et al. ................. | 345/590 |
| 6,031,544 A | * | 2/2000 | Yhann ..................... | 345/620 |
| 6,345,117 B1 | * | 2/2002 | Klassen ................... | 382/167 |
| 6,366,361 B1 | * | 4/2002 | Dermer et al. ............ | 358/1.9 |
| 6,377,711 B1 | * | 4/2002 | Morgana .................. | 382/274 |
| 6,556,313 B1 | * | 4/2003 | Chang et al. ............. | 358/1.9 |
| 6,828,985 B1 | * | 12/2004 | Long et al. ................ | 345/620 |

FOREIGN PATENT DOCUMENTS

EP 840500 A2 * 5/1998

* cited by examiner

*Primary Examiner*—Kimberly Williams
*Assistant Examiner*—Beniyam Menberu
(74) *Attorney, Agent, or Firm*—Fish & Richardson P.C.

(57) ABSTRACT

Methods and apparatus implementing techniques for identifying, in a device space, an effective centerscan object color along an edge between an overscan object and a centerscan object, the overscan object having a higher paint order than the centerscan object. The edge is mapped to the device space. A set of overscan boundary pixels is identified in the device space, the overscan boundary pixels being device space pixels that are intersected by the edge. A vector pointing in a direction of the centerscan object relative to the edge is created. The vector is applied to each overscan boundary pixel in the set of overscan boundary pixels to identify a corresponding set of centerscan boundary pixels in the device space. Each centerscan boundary pixel is mapped to the centerscan object to identify a color of the centerscan boundary pixel. A corresponding method for reversed paint order is also described.

48 Claims, 6 Drawing Sheets

IMAGE EDGE COLOR COMPUTATION

BACKGROUND OF THE INVENTION

The present invention relates to computer graphics applications.

A page in an electronic document may include various types of objects, including text, line art, and images. An electronic document can generally be created and edited by a user on a computer using a computer graphics application. Most computer graphics applications can also be used to produce (directly or indirectly) printed output defined by the electronic document. Examples of computer graphics applications include the Adobe Illustrator® and Photoshop® applications, both available from Adobe Systems Incorporated of San Jose, Calif. Objects in an electronic document may be represented in vector form, raster form, or in hybrid forms.

A color page in an electronic document includes information about the colors used in the page. Colors are defined in a color space, which provides a data representation of a range of colors in terms of basic color components. The specific color components will vary depending on the color system used for the process inks in the printing system. For example, in the CMYK color system, colors are represented as combinations of cyan (C), magenta (M), yellow (Y), and black (or "key") (K).

To create a physical page printed with inks and corresponding to a color page in an electronic document, data representations of colors are used to create color separations. The color separations are generally created by computer programs running on general or special purpose systems. Generally, each color separation used by an output device corresponds to a color component of the color system used by the device. For example, data representations of colors in output generated for an imagesetter using a CMYK color system are used to create color separations for cyan, magenta, yellow, and black, with each separation indicating regions where the corresponding ink should be applied, as well as the amount of ink that should be applied.

Misregistration or inaccuracies in the physical placement of two or more colors with respect to each other on a printed sheet can cause unintentional gaps or overlaps at edges of color regions on an output page. Misregistration can occur for a variety of reasons relating to the performance of people, machines, and materials.

To minimize the effects of misregistration, a technique known as trapping is used to adjust the shapes of color regions by spreading (expanding) some color regions to prevent gaps, and choking (contracting) other color regions to prevent overlaps. In determining whether an edge of a color region requires a trap, trapping systems evaluate the color on both sides of the edge. A method and apparatus for electronically trapping a printed color page in a desktop publishing, layout, graphics, or similar applications program is set forth in U.S. Pat. No. 5,295,236, entitled "Applying Traps to a Printed Page Specified in a Page Description Language Format," assigned to the assignee of the present invention and hereby incorporated in its entirety. A method and apparatus for vector map representation of page information to perform trapping is set forth in U.S. Pat. No. 6,031,544, entitled "Vector Map Planarization and Trapping," also assigned to the assignee of the present invention and hereby incorporated in its entirety.

When trapping a vector object to another vector object, the color on both sides of the edge separating the vector objects can be determined by planarizing the vector objects.

A vector object may alternatively intersect a raster image that is made up by a plurality of image pixels. If a vector object intersects a raster image, the edge between the vector object and raster image (vector-image edge) will have the vector color on one side and image color on the other side. The actual colors along the vector-image edge can be determined by rendering the raster image and vector object into a pixel buffer at device resolution and using raster based edge detection to accurately determine the edges and colors. While this method guarantees high fidelity vector-image edge color determination, it has an associated computational overhead of rasterizing the data at device resolution and requires extra memory for a raster buffer. Furthermore, this method is likely to produce edges that are jagged (also referred to as pixilation), placing additional complexity on the trapping process to either smooth the jagged edge or handle the extra data points to accommodate the pixilation.

An alternative method determines the color along the image side of a vector-image edge by splitting the edge into smaller edges and identifying the image edge color as the color of the image pixel intersected by the edge. However, the edge splitting method can lead to inaccurate image edge color determinations because the image pixel color seen on the image side of the edge when rendered in device space may not be the color of the image pixel intersected by the edge.

The edge splitting method does not take into account the different rendering rules for vector objects and images. Vector objects are typically rendered into the device space (having a grid of device pixels) using an overscan rule, which assigns the vector object's color to each device pixel that is intersected by the object. A vector object is therefore an example of an overscan object. A raster image, on the other hand, is a type of centerscan object. Accordingly, raster images are rendered using a centerscan rule which assigns a device pixel the color of the image pixel to which the center of the device pixel maps.

In addition to the different rendering rules, images and vector objects in an electronic document are generally rendered in a particular order, the paint order. If a vector object has a higher paint order than an image, that is, the vector object is rendered after the image, the overscan rule will determine the color of the device pixel intersected by the edge. Likewise, if the image has a higher paint order, the centerscan rule will determine the color of the device pixel intersected by the edge. It follows from the different rendering rules that the color on the image side of the edge is not always the color of the image pixel intersected by the edge. Therefore, the edge splitting method may lead to inaccurate edge color determinations resulting in incorrect trap decisions and incorrectly colored traps. The same problem will occur when trapping any overscan object to a centerscan object or when trapping a centerscan object to another centerscan object.

Another problem with the edge splitting method occurs when the raster image resolution is greater than the device resolution, thus more than one image pixel will map to each device pixel. In this case, the edge splitting method will produce more split edges than needed. The excess split edges may be created with colors that are not present in the image when it is rendered in the output device, thus resulting in inaccurate trapping decisions and incorrectly colored traps.

SUMMARY OF THE INVENTION

In general, in one aspect, this invention provides methods and apparatus, including computer program products, implementing and using techniques for identifying, in a device space, an effective centerscan object color along an edge between an overscan object and a centerscan object, the overscan object having a higher paint order than the centerscan object. The edge is mapped to the device space and a set of overscan boundary pixels are defined in the device space, the overscan boundary pixels being device space pixels that are intersected by the edge. A vector pointing in a direction of the centerscan object relative to the edge is created. The vector is applied to each overscan boundary pixel in the set of overscan boundary pixels to identify a corresponding set of centerscan boundary pixels in the device space. Each centerscan boundary pixel is mapped to the centerscan object to identify a color of the centerscan boundary pixel.

Advantageous implementations of the invention include one or more of the following features. The centerscan object can be a raster image and the overscan object can be a vector object. An image resolution can differ from a device resolution. Identifying a color of the pixel can include coloring the centerscan boundary pixel in the device space in accordance with a center scan rule. Creating a vector can include creating a vector specified in device pixels. Creating a vector can include creating a vector normal to the edge. Creating a vector can include creating a vector normal to an axis in the device space. Applying the vector to each overscan object boundary pixel can include identifying a device pixel on the centerscan object side of the edge, adjacent to an overscan boundary pixel, as a centerscan boundary pixel. One or more subsections can be identified, each subsection including one or more contiguous centerscan boundary pixels having the same color, to be used in trapping In general, in another aspect, the invention provides methods and apparatus, including computer program products, implementing and using techniques for identifying, in a device space, an effective centerscan object color along an edge between an overscan object and a centerscan object, the centerscan object having a higher paint order than the overscan object. The edge is mapped to the device space and a set of device space pixels that are intersected by the edge is identified. For each pixel in the set of pixels it is determined if a center of the pixel maps to the centerscan object. If the center of the pixel maps to the centerscan object the pixel is identified as a centerscan boundary pixel. If the center of the pixel does not map to the centerscan object, the pixel is identified as an overscan boundary pixel. A vector pointing in a direction of the centerscan object relative to the edge is created. The vector is applied to each identified overscan boundary pixel to identify a corresponding centerscan boundary pixel to each identified overscan boundary pixel. Each centerscan boundary pixel is mapped to the centerscan object to identify a color of the centerscan boundary pixel.

In general, in another aspect, the invention provides methods and apparatus, including computer program products, implementing and using techniques for identifying, in a device space, an effective color along one side of an edge between a first centerscan object and a second centerscan object. The edge is mapped to the device space. A set of device space pixels that are intersected by the edge is identified. A pixel in the set of device space pixels is defined as a first object boundary pixel if the center of the pixel maps to the first centerscan object. A pixel in the set of device space pixels is defined as a second object boundary pixel if the center of the pixel does not map to the first centerscan object. A vector pointing in a direction of the second centerscan object relative to the edge is created. The vector is applied to each identified first object boundary pixel to identify a corresponding second object boundary pixel to each identified first object boundary pixel. Each second object boundary pixel is mapped to the second centerscan object to identify a color of the second object boundary pixel.

The invention can be implemented to realize one or more of the following advantages. The invention retains accuracy in identifying the color along an image side of an edge when the edge, image, and device coordinate spaces differ, or when the image resolution differs from the device resolution, or when the image and vector object are rendered using centerscan and overscan rules, respectively. The invention correctly accounts for the paint order of the image and vector object. The invention does not require rasterization in device space of the image and/or vector object in order to identify the edge color. The edge color is used to make accurate trapping decisions. The invention identifies trapping regions while the image and vector object are retained in their native representation and space.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

The method in accordance with the invention for determining a color along an edge between two objects will now be described by way of example for three separate cases. The first example describes a situation in which a vector object is adjacent to a raster image and the vector object has a higher paint order. The second example describes a situation in which a vector object is adjacent to a raster image and the raster image has a higher paint order. The third example describes a situation in which two raster images are adjacent to each other.

Vector Object and Raster Image, in which the Vector Object has Higher Paint Order In one implementation of the invention, the image color along an edge between a vector object and a raster image is identified, where the vector object has a higher paint order than the image. The raster image and the vector object are represented as polygons. A vector polygon defines the region containing the vector object and an image polygon contains the image. The image polygon is the intersection of a clip polygon with an image rectangle. The raster image is rendered using a centerscan rule, assigning device pixels the color of the image pixel to which the center of the device pixel maps. The vector object is rendered using an overscan rule, assigning the vector object's color to each device pixel intersected by the vector object. The edge, image and device coordinate spaces may differ. The image resolution may differ from the device resolution.

Figure 1:
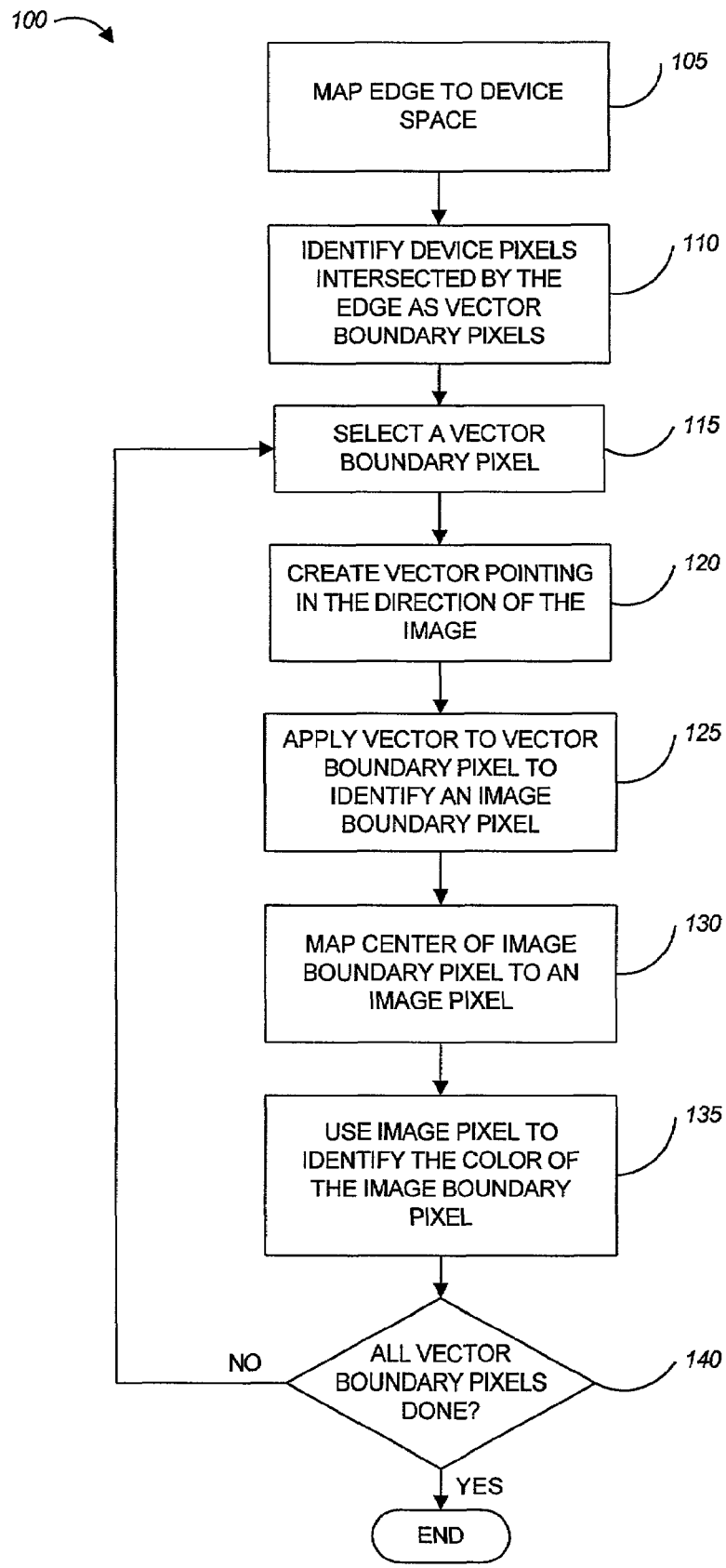
FIG. 1 is a flowchart showing a method for determining an effective image color along the image side of an edge defining the intersection between a vector object and an image, where the vector object has a higher paint order than the image.
Figure 4:
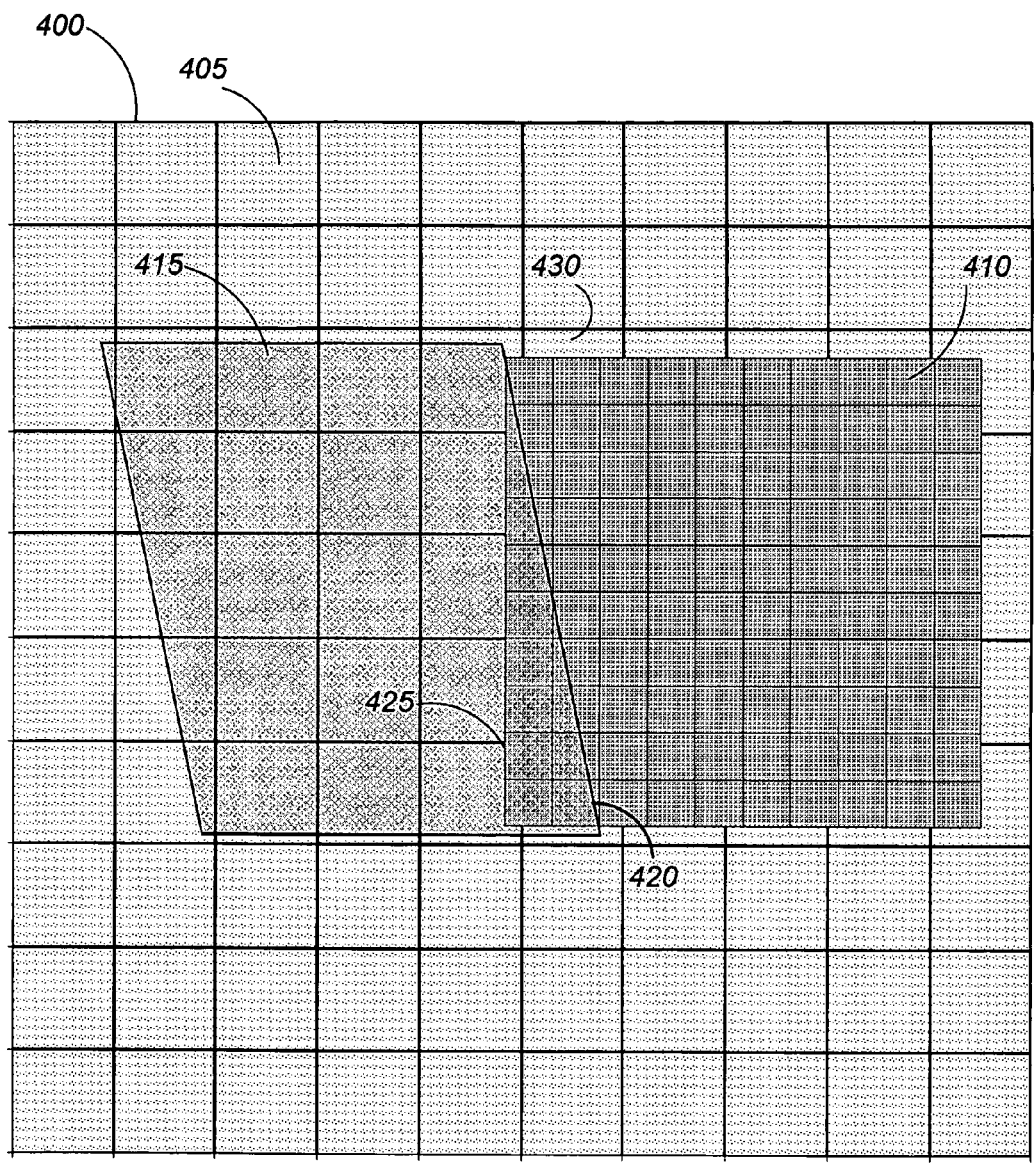
FIG. 4 is a schematic diagram of an edge defining the intersection between a vector object and an image in a device space.

Referring now to FIG. 1 and to FIG. 4, a process (100) for identifying colors along an edge between a vector object and an image in accordance with the invention will be explained. As shown in FIG. 4, a vector object (415) partly overlaps an image (410). The process first maps an edge (420) between the image (410) and the vector object (415) to a device space (400) (step 105). The process can use any suitable line drawing algorithm to identify each device pixel (405) intersected by edge (420) as a vector boundary pixel (step 110). Next, the process proceeds with identifying a set of image boundary pixels corresponding to the vector boundary pixels. A corresponding image boundary pixel is a device pixel (405) located on the image side of the edge (420) and adjacent to the vector boundary pixel. The process identifies the image boundary pixels by selecting one of the identified vector boundary pixels (step 115) and creating a vector, with a magnitude of one device space pixel (405), pointing in the direction of the image (410) relative to the edge (420) (step 120). The vector can be normal to the edge (420). Alternatively, the vector can be normal to an axis in device space that forms the smallest angle with the edge. When the vector has been created, the process applies the vector to a vector boundary pixel, using vector addition, to identify a corresponding image boundary pixel (step 125). The process then determines the color of the image boundary pixel by applying a centerscan rule to the image boundary pixel (step 130). In accordance with the centerscan rule, the process maps the center of the image boundary pixel in the device space (400) to an image pixel (410) in the image space. The process then assigns the color of the image pixel (410) to the image boundary pixel in the device space (400) (step 135). After the color has been assigned, the process checks if there are any more vector boundary pixels to process (step 140). If there are more vector boundary pixels to process, the process returns to step 115 and repeats steps 115 through 140 for each remaining vector boundary pixel until all vector pixels have been processed and the process ends.

Figure 6:
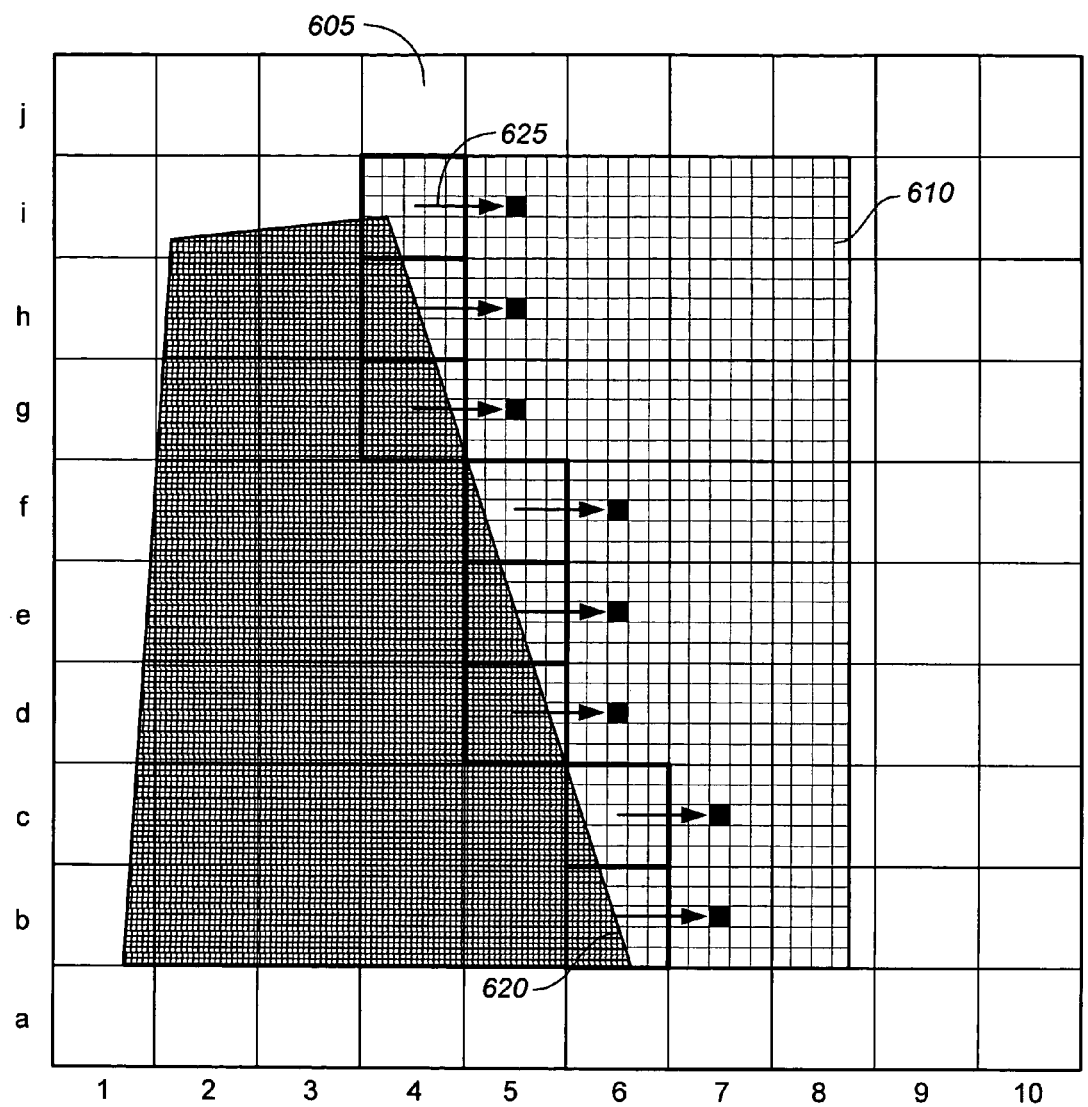
FIG. 6 is a schematic diagram illustrating the method described in FIG. 1

The process for identifying colors along an edge between a vector object and an image (100) is further illustrated in FIG. 6. Referring to FIG. 6, the edge (620) intersects the device pixels (605) located at (6,b), (6,c), (5,d), (5,e), (5,f), (4,g), (4,h), and (4,i). The process identifies the device pixels intersected by the edge (620) as vector boundary pixels. For each vector boundary pixel, the process (100) creates a unit vector (625), specified in device pixels, pointing in the direction of the image (610) relative to the edge (620). Next, the process (100) applies the vector (625) to the vector boundary pixel to identify a corresponding image boundary pixel. Referring to FIG. 6, the corresponding image boundary pixels are located at (7,b), (7,c), (6,d), (6,e), (6,f), (5,g), (5,h), and (5,i). The process then determines the color of each image boundary pixel by applying a centerscan rule to the image boundary pixel. Note that even though the device pixel grid and the image pixel grid are shown to be parallel to each other in the present and following examples, the grids may be slanted relative to each other and the process will still generate the same results.

After identifying the color of each image boundary pixel (430), another process can divide the edge (420) into sub-sections forming a start-to-end run of image boundary pixels (430) of constant color. The start-to-end run of image boundary pixels yields image colored sub-sections of the edge (420) which can be used in trapping (e.g. to determine trap risks and trap color).

Vector Object and Raster Image, in which the Image has Higher Paint Order

In another implementation of the invention, the image color along an edge between a vector object and a raster image is identified, where the image has a higher paint order than the vector object. The raster image and vector object are represented and generated in the same way as in the previous example. Two different cases will be described. The first case describes a process where no clipping path has been applied to the image, and the second case shows the same process for when a clipping path has been applied to the image. Thus, the basic method is the same, but the image polygon to which the method is applied is slightly different.

Figure 2:
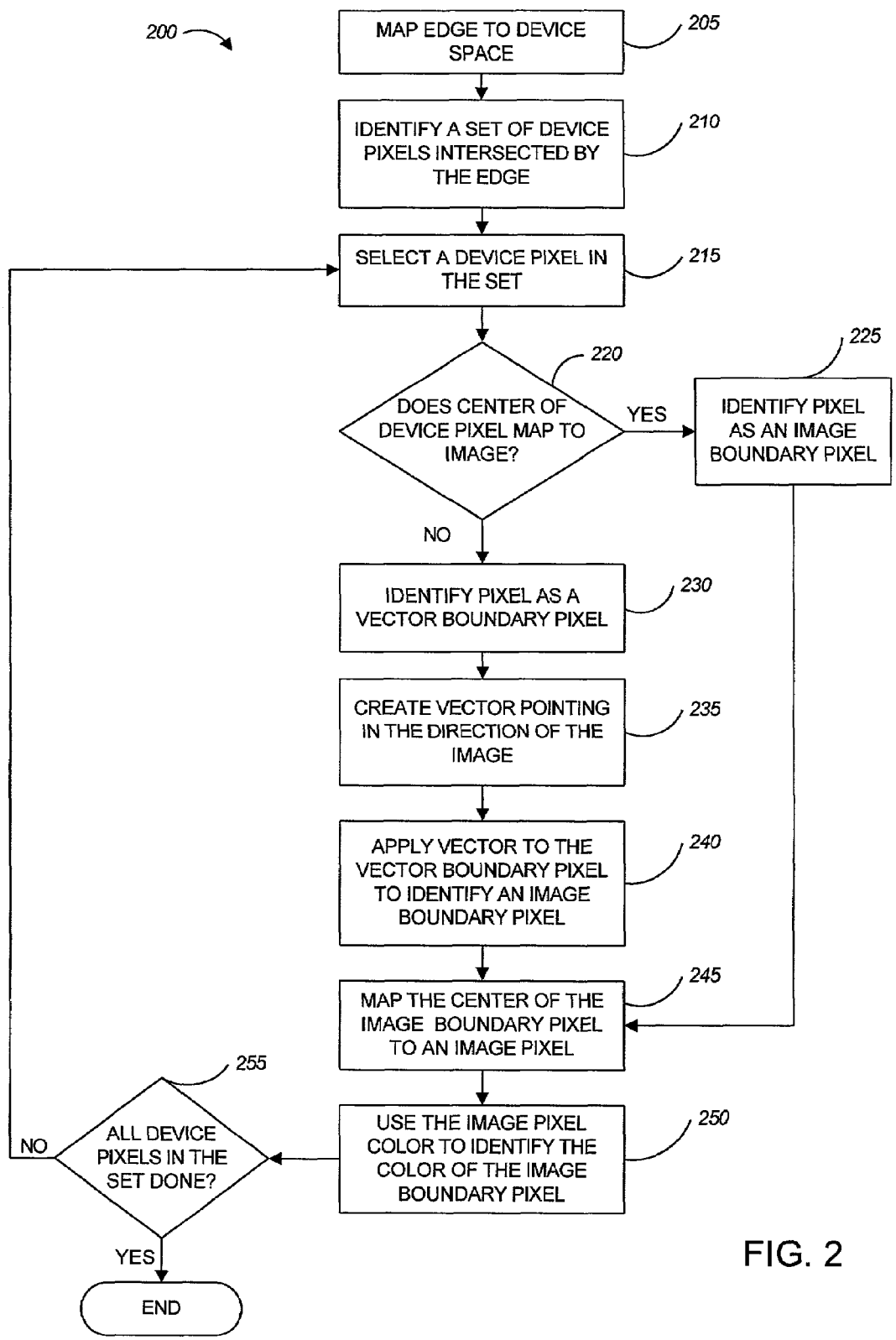
FIG. 2 is a flowchart showing a method for determining the effective image color along the image side of an edge defining the intersection between a vector object and an image, where the image has a higher paint order than the vector object.

Referring now to FIG. 2 and FIG. 4, a process (200) further includes mapping the edge (425) to device space (400) (step 205) and identifying a set of device pixels (405) intersected by the edge (425) (step 210). Due to the reverse paint order, the entire image (410) will overlap the vector object (415) and the vertical edge (425) will be the edge of interest. After identifying the device pixels that are intersected by the edge (425), the process selects a device pixel in the set (step 215) and checks if the center of the selected device pixel (405) maps to the image (step 220). If the center does map to the image (410), then the process identifies the device pixel (405) as an image boundary pixel (step 225) and continues to map the center of the image boundary pixel to an image pixel (step 245), which will be explained further below. If the center of the device pixel (405) does not map to the image (410), then the device pixel (405) is identified as a vector boundary pixel (step 230). The process then identifies a corresponding image boundary pixel by creating a vector, with a magnitude of one device space pixel, pointing in the direction of the image (410) relative to the edge (425) (step 235). The vector can be normal to the edge (425). Alternatively, the vector can be normal to an axis in device space that forms the smallest angle with the edge. When the vector has been created, the process applies the vector to the vector boundary pixel, using vector addition to identify a corresponding image boundary pixel (step 240). The process then determines the color of the image boundary pixel by applying a centerscan rule to the image boundary pixel (steps 245, 250) as was described in the previous example. After the color has been assigned, the process checks if there are any more device pixels intersected by the edge to process (step 255). If there are more device pixels to process, the process returns to step 215 and repeats steps 215 through 255 for each remaining device pixel until all the device pixels in the set have been processed, which ends the process.

In the second case, the image has been clipped, using a clipping path, in order to show the part of the vector object that was concealed in the previous case. The process will therefore be applied to the slanted edge (420) instead of the vertical edge (425). The process identifies a set of device pixels that are intersected by the edge (420), that is, the clipping path. After identifying the set of device pixels, the process selects a device pixel in the set (step 215) and checks if the center of the selected device pixel (405) maps to the image (410) (step 220). The center of the selected device pixel is considered to map to the image (410) if the center falls within the original image, regardless of whether the center falls within the clipping path or not. If the clipping path is larger than the original image, the center of a device pixel may fall within the clipping path, but outside the original image. In this case, the device pixel is not considered to map to the image (410). In other words, the point of reference is always the original image, regardless of the size and shape of the clipping path as far as color mapping goes. The purpose of the clipping path is merely to define the region that is to be painted by the image pixel colors, that is, if the vertical edge (425) or the slanted edge (420) shown in FIG. 4 should be examined.

If the center does map to the image (410), then the process identifies the device pixel (405) as an image boundary pixel (step 225) and continues to map the center of the image boundary pixel to an image pixel (step 245), as described above. If the center of the device pixel (405) does not map to the image (410), then the device pixel (405) is identified as a vector boundary pixel (step 230), just like in the previous example.

The remaining process steps are then carried out in the same way as was explained above for the case with no clipping path.

After identifying the color of each image boundary pixel, the edge can be divided into subsections forming a start-to-end run of image boundary pixels of constant color. The start-to-end run of image boundary pixels of constant color yields image colored sub-sections of the edge (425) which can be used in trapping (e.g. to determine trap risks and trap color).

Two raster images

In a further implementation of the invention, the image color along one side of an edge between two raster images is identified. The raster images are each represented as polygons and rendered using a centerscan rule. The edge, image, and device coordinate spaces may differ. The image resolution may differ from the device resolution.

Figure 3:
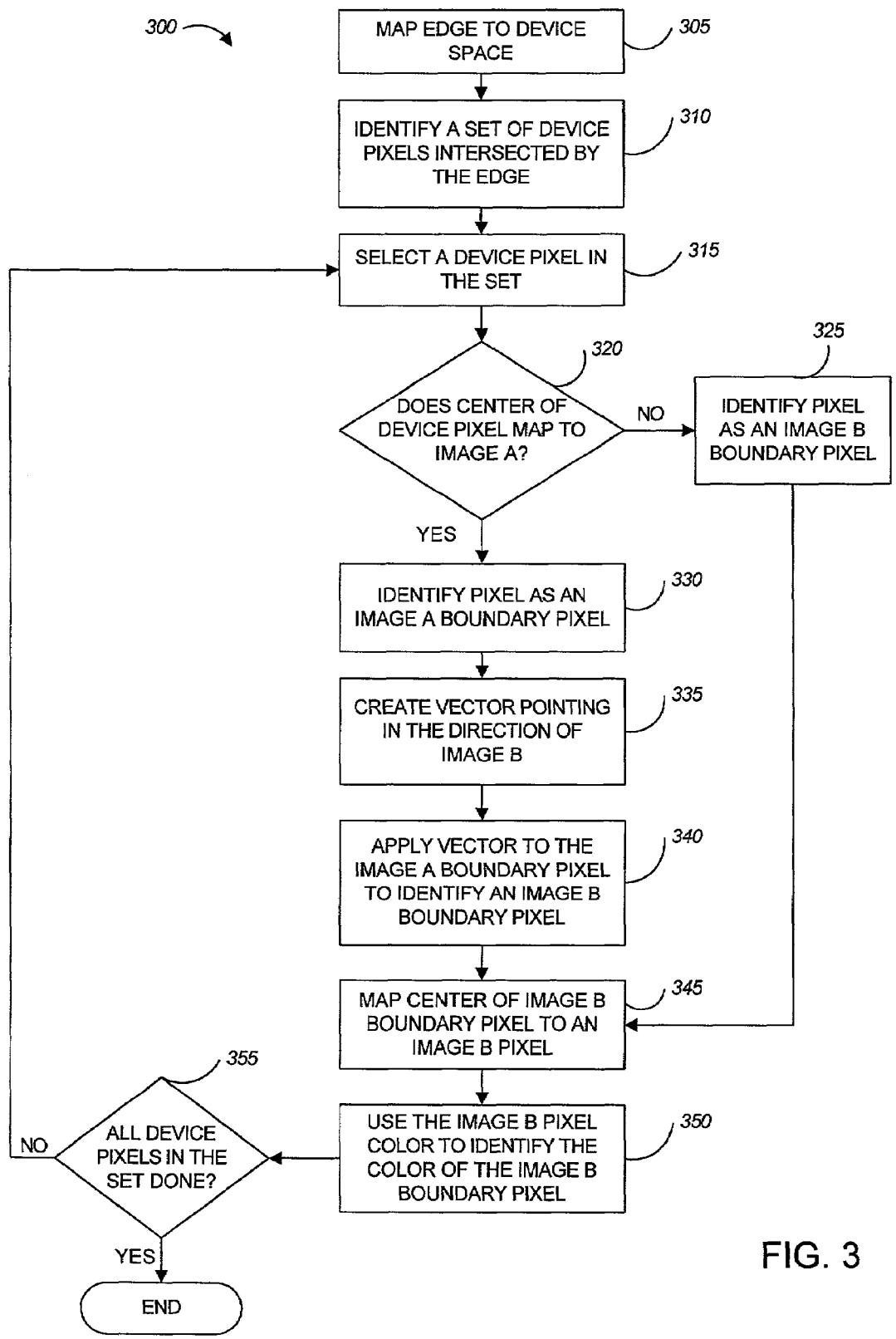
FIG. 3 is a flowchart showing a method for determining the effective image color along one side of an edge defining the intersection between two images.
Figure 5:
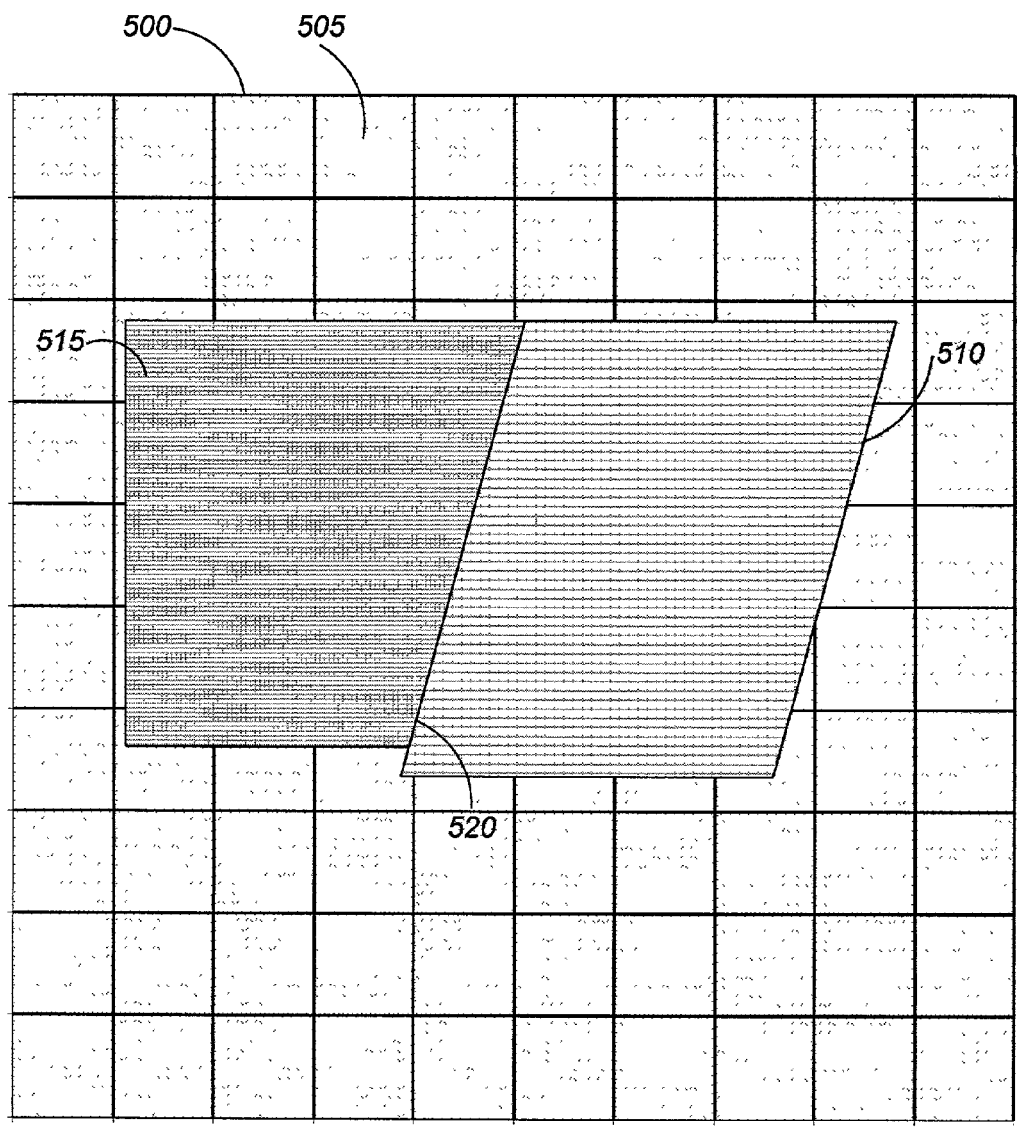
FIG. 5 is a schematic diagram of an edge defining the intersection between two images in a device space.

Referring to FIG. 3 and FIG. 5, a process (300) determines the color of Image B (510) along the edge (520) of Image A (515) and Image B (510), when image A is rendered after image B, that is, when image A has a higher paint order. The process first maps the edge (520) to device space (500) (step 305) and identifies a set of device pixels (505) intersected by the edge (520) (step 310). The process proceeds by selecting a device pixel in the set (step 315) and checks whether the device pixel is an Image A boundary pixel (or, alternatively, an Image B boundary pixel) (step 320). If the center of the device pixel (505) does not map to Image A, the process identifies the device pixel as an Image B boundary pixel (step 325) and continues to step 345 which will be described below. The mapping of the device pixel centers are carried out in a corresponding way to the mapping that was explained above with reference to the example of a centerscan object having a higher paint order than the overscan object. Clipping paths are also treated in a corresponding manner. If the center of the device pixel (505) maps to Image A (510), the device pixel (505) is identified as an Image A boundary pixel (step 330) and the process identifies the corresponding Image B boundary pixel by creating a vector, specified in device space pixels, pointing in the direction of Image B (510) relative to the edge (520) (step 335). The vector can be normal to the edge (520). Alternatively, the vector can be normal to an axis in device space that forms the smallest angle with the edge. When the vector has been created, the process applies the vector to the Image A boundary pixel, using vector addition to identify a corresponding Image B boundary pixel (step 340). The process then determines the color of the Image B boundary pixel by applying a centerscan rule to the Image B boundary pixel (steps 345 and 350). After the color has been assigned, the process checks if there are any more device pixels intersected by the edge to process (step 355). If there are more device pixels to process, the process returns to step 315 and repeats steps 315 through 350 for each remaining device pixel until all the device pixels in the set have been processed and the process ends.

After identifying the color of each Image B boundary pixel, another process can divide the edge into subsections forming a start-to-end run of Image B boundary pixels of constant color. The start-to-end run of Image B boundary pixels of constant color yields Image B colored sub-sections of the edge (520) which can be used in trapping (e.g. to determine trap risks and trap color).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. In an alternative embodiment of the invention the image color along an edge between a vector object and an image, where the vector object has a higher paint order is determined, by applying a vector to the edge after mapping but before drawing the edge in device space. That is the edge should be in device coordinates when the vector is applied. In this alternative embodiment, a vector with a magnitude of one device space pixel and pointing in the direction of the image relative to the edge is created. The process then uses vector addition to add the vector to the edge before drawing the edge to the device space. The process identifies the image boundary pixels as the device pixels intersected by the edge, and applies a centerscan rule to determine the color of the image boundary pixels.

What is claimed is:

1. A computer-implemented method for identifying, in a device space, an effective centerscan object color along an edge between an overscan object and a centerscan object, the overscan object having a higher paint order than the centerscan object, the method comprising:
    mapping the edge to the device space;
    identifying a set of overscan boundary pixels in the device space, the overscan boundary pixels being device space pixels that are intersected by the edge;
    identifying a set of centerscan boundary pixels in the device space, each centerscan boundary pixel being a device space pixel on the centerscan object side of the edge that is adjacent to an overscan boundary pixel; and
    mapping each centerscan boundary pixel to the centerscan object to identify a color of the centerscan boundary pixel.

2. The method of claim 1, wherein the centerscan object is a raster image and the overscan object is a vector object.

3. The method of claim 2, wherein a size of pixels in the centerscan object is different than a size of the centerscan boundary pixels when each centerscan boundary pixel is mapped to the centerscan object.

4. The method of claim 1, wherein mapping each centerscan boundary pixel to the centerscan object to identify the color of the centerscan boundary pixel comprises:
    assigning a color to the centerscan boundary pixel using a color of the centerscan object at the center of the centerscan boundary pixel.

5. The method of claim 1, wherein identifying the set of centerscan boundary pixels includes:
    creating a vector pointing in a direction of the centerscan object relative to the edge, the vector being specified in device pixels; and
    applying the vector to each overscan boundary pixel in the set of overscan boundary pixels.

6. The method of claim 1, wherein identifying the set of centerscan boundary pixels includes:
    creating a vector pointing in a direction of the centerscan object relative to the edge, the vector being normal to the edge; and
    applying the vector to each overscan boundary pixel in the set of overscan boundary pixels.

7. The method of claim 1, wherein identifying the set of centerscan boundary pixels includes:
    creating a vector pointing in a direction of the centerscan object relative to the edge, the vector being normal to an axis in the device space; and
    applying the vector to each overscan boundary pixel in the set of overscan boundary pixels.

8. The method of claim 1, further comprising:
    identifying one or more subsections, each subsection including one or more contiguous centerscan boundary pixels having the same color, to be used in trapping.

9. A computer program product, residing on a computer-readable medium, for identifying, in a device space, an effective centerscan object color along an edge between an overscan object and a centerscan object, the overscan object having a higher paint order than the centerscan object, the computer program product comprising instructions for causing a computer to:
    map the edge to the device space;
    identify a set of overscan boundary pixels in the device space, the overscan boundary pixels being device space pixels that are intersected by the edge;
    identify a set of centerscan boundary pixels in the device space, each centerscan boundary pixel being a device space pixel on the centerscan object side of the edge that is adjacent to an overscan boundary pixel; and
    map each centerscan boundary pixel to the centerscan object to identify a color of the centerscan boundary pixel.

10. The computer program product of claim 9, wherein the centerscan object is a raster image and the overscan object is a vector object.

11. The computer program product of claim 10, wherein a size of pixels in the centerscan object is different than a size of the centerscan boundary pixels when each centerscan boundary pixel is mapped to the centerscan object.

12. The computer program product of claim 9, wherein the computer program further includes instructions for causing a computer to:
    assign a color to each centerscan boundary pixel using a color of the centerscan object at the center of the respective centerscan boundary pixel.

13. The computer program product of claim 9, wherein the instructions for causing a computer to identify the set of centerscan boundary pixels include instructions for causing a computer to:
    create a vector pointing in a direction of the centerscan object relative to the edge, the vector being specified in device pixels; and
    apply the vector to each overscan boundary pixel in the set of overscan boundary pixels.

14. The computer program product of claim 9, wherein the instructions for causing a computer to identify the set of centerscan boundary pixels include instructions for causing a computer to:
    create a vector pointing in a direction of the centerscan object relative to the edge, the vector being normal to the edge; and
    apply the vector to each overscan boundary pixel in the set of overscan boundary pixels.

15. The computer program product of claim 9, wherein the instructions for causing a computer to identify the set of centerscan boundary pixels include instructions for causing a computer to:
    create a vector pointing in a direction of the centerscan object relative to the edge, the vector being normal to an axis in the device space; and
    apply the vector to each overscan boundary pixel in the set of overscan boundary pixels.

16. The computer program product of claim 9, wherein the computer program further includes instructions for causing a computer to:
 identify one or more subsections, each subsection including one or more contiguous centerscan boundary pixels having the same color, to be used in trapping.

17. A computer-implemented method for identifying, in a device space, an effective centerscan object color along an edge between an overscan object and a centerscan object, the centerscan object having a higher paint order than the overscan object, the method comprising:
 mapping the edge to the device space;
 identifying a set of device space pixels that are intersected by the edge;
 determining for each pixel in the set of pixels if a center of the pixel maps to the centerscan object;
 identifying the pixel as a centerscan boundary pixel if the center of the pixel maps to the centerscan object;
 identifying the pixel as an overscan boundary pixel if the center of the pixel does not map to the centerscan object;
 computing a direction of the centerscan object relative to the edge, the direction indicating on which side of the edge the centerscan object lies;
 applying the direction to each identified overscan boundary pixel to identify a corresponding centerscan boundary pixel, each centerscan boundary pixel being a device space pixel on the centerscan object side of the edge that is adjacent to an overscan boundary pixel; and
 mapping each centerscan boundary pixel to the centerscan object to identify a color of the centerscan boundary pixel.

18. The method of claim 17, wherein the centerscan object is a raster image and the overscan object is a vector object.

19. The method of claim 18, wherein a size of pixels in the centerscan object is different than a size of the centerscan boundary pixels when each centerscan boundary pixel is mapped to the centerscan object.

20. The method of claim 17, wherein mapping each centerscan boundary pixel to the centerscan object to identify the color of the centerscan boundary pixel comprises:
 assigning a color to the centerscan boundary pixel using a color of the centerscan object at the center of the centerscan boundary pixel.

21. The method of claim 17, wherein computing a direction comprises:
 creating a vector specified in device pixels.

22. The method of claim 17, wherein computing a direction comprises:
 creating a vector normal to the edge.

23. The method of claim 17, wherein computing a direction comprises:
 creating a vector normal to an axis in the device space.

24. The method of claim 17, further comprising:
 identifying one or more subsections, each subsection including one or more contiguous centerscan boundary pixels having the same color, to be used in trapping.

25. A computer program product, residing on a computer-readable medium, for identifying, in a device space, an effective centerscan object color along an edge between an overscan object and a centerscan object, the centerscan object having a higher paint order than the overscan object, the computer program product comprising instructions for causing a computer to:
 map the edge to the device space;
 identify a set of device space pixels that are intersected by the edge;
 determine for each pixel in the set of pixels if a center of the pixel maps to the centerscan object;
 identify the pixel as a centerscan boundary pixel if the center of the pixel maps to the centerscan object;
 identify the pixel as an overscan boundary pixel if the center of the pixel does not map to the centerscan object;
 compute a direction of the centerscan object relative to the edge, the direction indicating on which side of the edge the centerscan object lies;
 apply the direction to each identified overscan boundary pixel to identify a corresponding centerscan boundary pixel, each centerscan boundary pixel being a device space pixel on the centerscan object side of the edge that is adjacent to an overscan boundary pixel; and
 map each centerscan boundary pixel to the centerscan object to identify a color of the centerscan boundary pixel.

26. The computer program product of claim 25, wherein the centerscan object is a raster image and the overscan object is a vector object.

27. The computer program product of claim 26, wherein a size of pixels in the centerscan object is different than a size of the centerscan boundary pixels when each centerscan boundary pixel is mapped to the centerscan object.

28. The computer program product of claim 25, wherein the computer program further includes instructions for causing a computer to:
 assign a color to each centerscan boundary pixel using a color of the centerscan object at the center of each respective centerscan boundary pixel.

29. The computer program product of claim 25, wherein the instructions for causing a computer to compute a direction include instructions for causing a computer to:
 create a vector specified in device pixels.

30. The computer program product of claim 25, wherein the instructions for causing a computer to compute a direction include instructions for causing a computer to:
 create a vector normal to the edge.

31. The computer program product of claim 25, wherein the instructions for causing a computer to compute a direction include instructions for causing a computer to:
 create a vector normal to an axis in the device space.

32. The computer program product of claim 25, wherein the computer program further includes instructions for causing a computer to:
 identify one or more subsections, each subsection including one or more contiguous centerscan boundary pixels having the same color, to be used in trapping.

33. A computer-implemented method for identifying, in a device space, an effective color along one side of an edge between a first centerscan object and a second centerscan object, the method comprising:
 mapping the edge to the device space;
 identifying a set of device space pixels that are intersected by the edge;
 identifying a pixel in the set of device space pixels as a first object boundary pixel if the center of the pixel maps to the first centerscan object;
 identifying a pixel in the set of device space pixels as a second object boundary pixel if the center of the pixel does not map to the first centerscan object;
 computing a direction of the second centerscan object relative to the edge, the direction indicating on which side of the edge the second centerscan object lies;
 applying the direction to each identified first object boundary pixel to identify a corresponding second object boundary pixel, each second object boundary pixel being a device space pixel on the second centerscan object side of the edge that is adjacent to a first object boundary pixel; and mapping each second object boundary pixel to the second centerscan object to identify a color of the second object boundary pixel.

34. The method of claim 33, wherein at least one of the first centerscan object and the second centerscan object is a raster image.

35. The method of claim 34, wherein a size of pixels in the second centerscan object is different than a size of the second object boundary pixels when each second object boundary pixel is mapped to the second centerscan object.

36. The method of claim 33, wherein mapping each second object boundary pixel to the second centerscan object to identify the color of the second object boundary pixel comprises:

assigning a color to the second object boundary pixel using a color of the second centerscan object at the center of the second object boundary pixel.

37. The method of claim 33, wherein computing a direction comprises:

creating a vector specified in device pixels.

38. The method of claim 33, wherein computing a direction comprises:

creating a vector normal to the edge.

39. The method of claim 33, wherein computing a direction comprises:

creating a vector normal to an axis in the device space.

40. The method of claim 33, further comprising:

identifying one or more subsections, each subsection including one or more contiguous centerscan boundary pixels having the same color, to be used in trapping.

41. A computer program product, residing on a computer-readable medium, for identifying, in a device space, an effective color along one side of an edge between a first centerscan object and a second centerscan object, the computer program product comprising instructions for causing a computer to:

map the edge to the device space;

identify a set of device space pixels that are intersected by the edge;

identify a pixel in the set of device space pixels as a first object boundary pixel if the center of the pixel maps to the first centerscan object;

identify a pixel in the set of device space pixels as a second object boundary pixel if the center of the pixel does not map to the first centerscan object;

compute a direction of the second centerscan object relative to the edge, the direction indicating on which side of the edge the second centerscan object lies;

apply the direction to each identified first object boundary pixel to identify a corresponding second object boundary pixel, each second object boundary pixel being a device space pixel on the second centerscan object side of the edge that is adjacent to a first object boundary pixel; and map each second object boundary pixel to the second centerscan object to identify a color of the second object boundary pixel.

42. The computer program product of claim 41, wherein at least one of the first centerscan object and the second centerscan object is a raster image.

43. The computer program product of claim 42, wherein a size of pixels in the second centerscan object is different than a size of the second object boundary pixels when each second object boundary pixel is mapped to the second centerscan object.

44. The computer program product of claim 41, wherein the computer program further includes instructions for causing a computer to:

assign a color to each second object boundary pixel using a color of the second centerscan object at the center of each respective second object boundary pixel.

45. The computer program product of claim 41, wherein the instructions for causing a computer to compute a direction include instructions for causing a computer to:

create a vector specified in device pixels.

46. The computer program product of claim 41, wherein the instructions for causing a computer to compute a direction include instructions for causing a computer to:

create a vector normal to the edge.

47. The computer program product of claim 41, wherein the instructions for causing a computer to compute a direction include instructions for causing a computer to:

create a vector normal to an axis in the device space.

48. The computer program product of claim 41, wherein the computer program further includes instructions for causing a computer to:

identify one or more subsections, each subsection including one or more contiguous centerscan boundary pixels having the same color, to be used in trapping.

* * * * *